(12) United States Patent
Naito

(10) Patent No.: US 12,439,022 B2
(45) Date of Patent: Oct. 7, 2025

(54) EVALUATION METHOD OF IMAGE BLUR CORRECTION CAPABILITY OF IMAGE CAPTURING APPARATUS, IMAGE CAPTURING APPARATUS, AND RECORDING MEDIUM

(71) Applicant: CANON KABUSHIKI KAISHA, Tokyo (JP)

(72) Inventor: Go Naito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 240 days.

(21) Appl. No.: 18/349,339

(22) Filed: Jul. 10, 2023

(65) Prior Publication Data

US 2024/0022706 A1 Jan. 18, 2024

(30) Foreign Application Priority Data

Jul. 12, 2022 (JP) ................................ 2022-111602

(51) Int. Cl.
*H04N 23/68* (2023.01)
*H04N 17/00* (2006.01)

(52) U.S. Cl.
CPC ....... *H04N 17/002* (2013.01); *H04N 23/6812* (2023.01); *H04N 23/687* (2023.01)

(58) Field of Classification Search
CPC .................................................. H04N 23/682
See application file for complete search history.

(56) References Cited

U.S. PATENT DOCUMENTS 8,878,943 B2 11/2014 Kusaka et al.
2005/0168581 A1* 8/2005 Shinohara .............. H04N 23/68
348/208.1

FOREIGN PATENT DOCUMENTS

WO 2013/076963 A1 5/2013

* cited by examiner

*Primary Examiner* — Michael H Hong
(74) *Attorney, Agent, or Firm* — Cowan, Liebowitz & Latman, P.C.

(57) ABSTRACT

A camera system control unit of a camera acquires a captured image of a subject, and acquires a detection signal relating to a vibration applied to the camera. The camera system control unit evaluates an image blur correction capability of the camera based on a first blur amount calculated based on the captured image that are acquired, and a second blur amount that is calculated based on the detection signal relating to the vibration that is acquired.

17 Claims, 8 Drawing Sheets

EVALUATION METHOD OF IMAGE BLUR CORRECTION CAPABILITY OF IMAGE CAPTURING APPARATUS, IMAGE CAPTURING APPARATUS, AND RECORDING MEDIUM

BACKGROUND OF THE INVENTION

Field of the Invention

The present invention relates to an evaluation method for the image blur correction capability of an image capturing apparatus, an image capturing apparatus, and a recording medium.

Description of Related Art

Due to the progression of high-performance image capturing apparatuses, most image capturing apparatuses and image capturing lenses have built-in blur correction mechanisms. Due to these blur correction mechanisms, when the user is performing image capturing while holding the image capturing apparatus in their hands, it is possible to decrease image blur that occurs in the captured images due to camera shake. PCT International Publication No. WO 13/076963 discloses a measurement method for measuring the effects of the image blur correction capability of an image capturing apparatus in which the image capturing apparatus is placed on a vibrating base, and the measurement is performed based on images that have been obtained in a state in which vibrations have been applied to the image capturing apparatus, and in a state in which the image capturing apparatus was still.

The technology that is disclosed in PCT International Publication No. WO 13/076963 inputs a vibration that has been determined into the image capturing apparatus using the vibrating base, and evaluates the image blur correction capability. However, there are differences in the actual camera shake depending on the user, and the evaluation results of the image blur correction capabilities that have been measured by the technology that is disclosed in PCT International Publication No. WO 13/076963 may not necessarily match the image blur correction effect that the photographer will actually experience. Therefore, it is desirable to evaluate the image blur correction capability with high precision regardless of the camera shake caused by the photographer.

SUMMARY OF THE INVENTION

The present invention provides an evaluation method that is able to evaluate the image blur correction capability of an image capturing apparatus regardless of the camera shake caused by the photographer.

The evaluation method according to one embodiment of the present invention is an evaluation method for an image blur correction capability of an image capturing apparatus, the method comprising: acquiring a captured image of a subject, acquiring a detection signal relating to vibrations applied to the image capturing apparatus, and evaluating the image blur correction capability based on a first blur amount calculated based on the acquired captured image, and a second blur amount calculated based on the acquired detection signal relating to the vibrations.

Further features of the present invention will become apparent from the following description of exemplary embodiments with reference to the attached drawings.

FIGS. 1A and 1B are diagrams showing a configurational example of an image capturing apparatus.

FIGS. 2A to 2F are diagrams explaining calculation methods for blur amounts used in the evaluation of image blur correction capability.

FIG. 3A to 3E are diagrams explaining one example of an evaluation method for image blur correction capability.

FIGS. 4A to 4E are diagrams explaining one example of an evaluation method for image blur correction capability.

FIGS. 5A and 5B are diagrams explaining storage methods for captured images and blur data.

FIG. 6 is a flowchart explaining an evaluation method for image blur correction capability.

FIGS. 7A and 7B are diagrams explaining an image apparatus according to a second embodiment.

FIGS. 8A to 8F are diagrams explaining evaluation methods for image blur correction capability.

BRIEF DESCRIPTION OF THE DRAWINGS

First Embodiment

FIG. 1A shows an image capturing apparatus and an evaluation chart. FIG. 1B shows a functional block diagram for the image capturing apparatus. In FIG. 1A, and FIG. 1B, it is assumed that the configurational elements with the same reference numerals are the same configurational elements.

In FIG. 1A, a photographer is holding an image capturing apparatus (a camera) 1 in their hands, and is capturing images of an evaluation chart 2. The evaluation chart 2 is a subject for evaluating (calculating) the image blur correction capability of the camera 1. In the example shown in FIG. 1A, the evaluation chart 2 is a chart with a checkered pattern having a plurality of black and white regions. In the example that is shown in FIG. 1B, the camera 1 has an image capturing optical system 3 and a blur correcting unit 12. The image capturing optical system 3 is provided on the lens barrel, and has a plurality of lenses such as a focus lens, a zoom lens, a blur correcting lens 3a, and the like. The blur correcting lens 3a corrects image blur in captured images caused by vibrations applied to the camera 1 (camera shake) by performing driving.

Figure 1A:
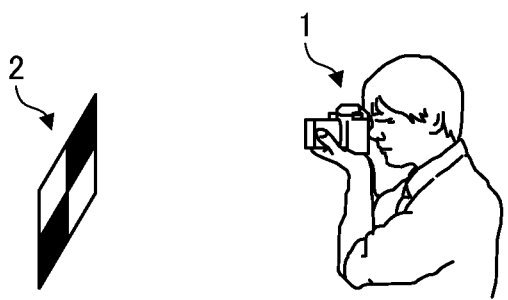
FIGS. 1A and 1B are images showing a configurational example of an image capturing apparatus according to the present embodiment.

A camera system control unit 5 controls the entirety of the camera 1. A vibration detecting unit 11 detects vibrations that are applied to the camera 1, and outputs a vibration detection signal (also referred to below as a "blur signal"). The vibration detecting unit 11 has a vibrating gyro or the like that is able to detect rotational vibrations on an optical axis 4 that is applied to the camera 1. In addition, the vibration detecting unit 11 is provided with, for example, an acceleration sensor or the like, and is able to detect horizontal movement vibrations applied to the camera 1. Therefore, the blur correcting unit 12 drives an image capturing element 6 or the blur correcting lens 3a on a plane perpendicular to the optical axis 4 based on a rotational blur or a horizontal movement blur output by the vibration detecting unit 11 in accordance with a command from the camera system control unit 5. The image blur in the captured images is thereby corrected.

In the present embodiment, an explanation is given of an image blur correction capability evaluation method for an image capturing apparatus in which both the blur correcting lens 3a and the image capturing element 6 are drivable. However, the present invention can also be applied to image capturing apparatuses that have only one of the blur correcting lens 3a or the image capturing element 6.

A display unit 9 displays captured images, information that is necessary for each type of setting, and the like. The display unit 9 has a rear surface display apparatus that is provided on the rear surface of the camera 1, an EVF (electronic view finder) that is provided inside of the finder of the camera 1, and the like. An operations detecting unit detects operation inputs from the photographer using operation methods including a shutter release button, which is not shown, or the like.

The camera 1 has an image capturing means, an image processing means, a recording and playback means, and a control means. The image capturing means includes the image capturing optical system 3 and the image capturing element 6. The image processing means includes an image processing unit 7. In addition, the recording and playback means includes a memory 8 and the display unit 9. Similarly, the control means includes the camera system control unit 5, the operations detecting unit 10, the vibration detecting unit 11, and the blur correcting unit 12. Note that the camera system control unit 5 is also able to perform driving using a driving means that is not shown, such as a focus lens, aperture, or the like, which are not shown, in addition to the blur correcting lens 3a.

The image capturing means is an optical processing system that forms the light from an object into images on an image capturing surface of the image capturing element 6 via the image capturing optical system 3. A focus evaluation amount and an appropriate exposure amount can be obtained from the image capturing element 6, and therefore, by appropriately adjusting the image capturing optical system 3 based on this signal, the image capturing element is exposed to a subject light with an appropriate amount of light, the image capturing element is exposed to an appropriate amount of subject light, and a subject image is image formed in the vicinity of the image capturing element. The image capturing element 6 photoelectrically converts the subject light and outputs a signal relating to the captured image.

The image processing unit 7 generates images for display or recording based on the output from the image capturing element 6. The image processing unit 7 has an A/D converter, a white balance adjusting circuit, a gamma correction circuit, an interpolation arithmetic circuit, and a color interpolation processing unit, and the like. The color interpolation processing unit executes color interpolation (de-mosaic) processing from the signal of a Bayer array, and generates a color image. In addition, the image processing unit 7 performs compression of images, videos, audio, and the like using a pre-determined method. The memory 8 is a storage unit that stores each type of information such as captured images, and the like.

The camera system control unit 5 controls each of an image capturing system, an image processing system, and a recording and playback system according to external operations. For example, upon the operations detecting unit 10 detecting that a shutter release button, which is not shown, has been pressed down, the camera system control unit 5 controls the drive of the image capturing element 6, the operation of the image processing unit 7, the compression processing, and the like. Furthermore, the camera system control unit 5 controls the state of each segment of the information display unit 9 that performs the display of information by the display unit 9. Note that, a configuration in which the rear surface display apparatus, which is not shown, of the camera 1 has a touch panel may also be used. According to this configuration, it is possible for the rear surface display apparatus to perform the roles of both the display unit 9 and the operating unit.

Adjustment operations to the image capturing system by the control system will now be explained. The camera system control unit 5 acquires the focal position and aperture position, and controls the focus lens drive mechanism, and an aperture drive mechanism, which are not shown, based on the signal output from the image capturing element 6. Furthermore, in the case in which the camera 1 has been set to a mode in which image blur correction is performed, the camera system control unit 5 appropriately controls the blur correcting unit 12 based on the vibration detection signal that has been acquired from the vibration detecting unit 11.

Figure 2A:
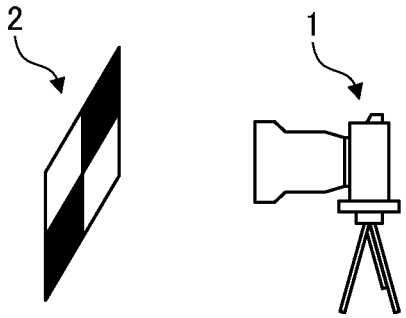
Figure 2B:
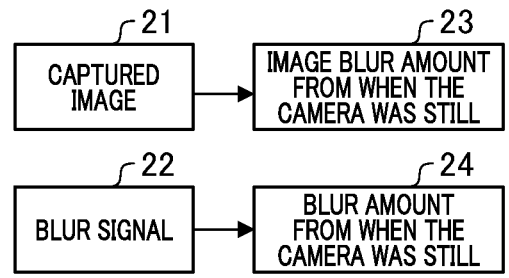
Figure 2C:
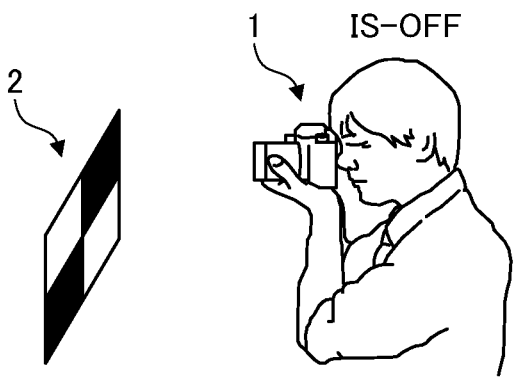
Figure 2D:
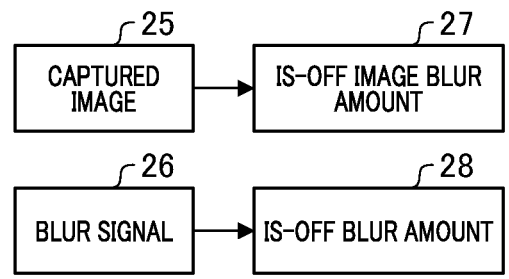
Figure 2E:
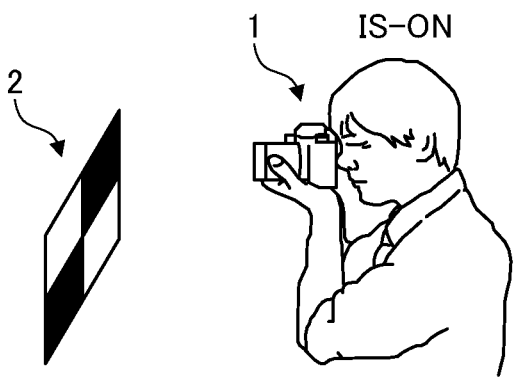
Figure 2F:
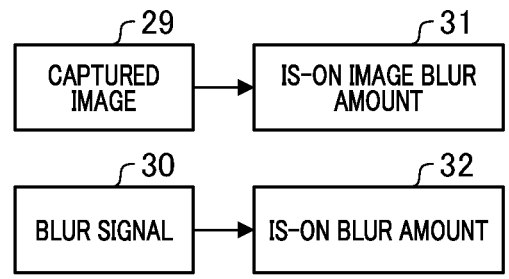

FIGS. 2A to 2F are diagrams explaining calculation methods for the blur amount used in the evaluation of the image blur correction capability in the present embodiment. In FIG. 2A, the camera 1 is placed on a tripod, which is a support member, and shows a state in which the evaluation chart 2 has been image captured in a state in which there is no camera shake to the camera 1. FIG. 2B shows one example of information acquired by the image capturing shown in FIG. 2A. FIG. 2C shows a situation in which the evaluation chart 2 is image captured in a state in which the photographer holds the camera 1, and the blur correcting unit 12 is not made to operate (a state in which the camera shake correction function is off). FIG. 2D shows one example of information that is acquired by the image capturing shown in FIG. 2D. FIG. 2E shows a situation in which the evaluation chart 2 is image captured in a state in which the photographer holds the camera 1 and the blur correcting unit 12 has been made to operate (a state in which the camera shake correction function is on). FIG. 2F shows one example of information acquired by the image capturing shown in FIG. 2E.

In the present embodiment, as is shown in FIG. 2A, image capturing is performed after placing the camera 1 on a tripod. In addition, as is shown in FIG. 2C, image capturing is also performed in a state in which the camera shake correction function is off with the photographer holding the camera. In addition, as is shown in FIG. 2E, image capturing is also performed in a state in which the camera shake correction function is on, in which the photographer supports the camera 1. Note that the image capturing does not necessarily need to be performed in the order described above, and for example, the image capturing in which the on/off state of the camera shake correction function is changed may be performed with either state being image captured first. In addition, the image capturing in the state in which the camera 1 has been placed on the tripod may also be performed last.

As is shown in FIG. 2B, by the image capturing shown in FIG. 2A, a captured image 21 is acquired from the image capturing element 6, and a blur signal 22 is acquired from the vibration detecting unit 11. The camera system control unit 5 calculates an image blur amount (a blur amount) based on both the captured image 21 and the blur signal 22. Specifically, the camera system control unit 5 calculates a blur amount (an image blur amount from when the camera was still) 23 based on the captured image 21. In addition, the camera system control unit 5 calculates a blur amount (a blur amount from when the camera was still) based on the blur signal 22.

During the image capturing shown in FIG. 2A, the camera 1 is placed on top of a tripod, and therefore, there is fundamentally no camera shake input. Therefore, the captured image 21 becomes an image with no blur. In addition, the blur signal 22 becomes a value (for example, a blur amount of 0) showing that the camera 1 was still.

The captured image 21 is an image for which there is fundamentally no blur. However, there is an out of focus amount present that is determined by the image capturing lenses including the focus lens, which is not illustrated, as well as by the image capturing element 6, or the like. Therefore, it is necessary to consider the value for the out of focus amount as an offset when evaluating the image blur correction capability. Therefore, the image blur amount 23 from when the camera was still that is shown in FIG. 2B is calculated to serve as the out of focus offset. The image blur amount 23 for when the camera was still uses the separation μm on the pixels or the image capturing surface as its unit. Specifically, the number of blurred pixels (the number of out of focus pixels), or the distance μm on the image capturing surface is recorded. In addition, the blur amounts (the out of focus offset amounts) in both the lateral direction of the screen (Yaw direction), and in the longitudinal direction (Pitch direction) are calculated. The average value for the blur amount may also be calculated.

The blur signal 22 is also detected in a state in which no camera shake is input, in the same manner as the captured image 21. Therefore, although the blur amount is fundamentally detected as being zero, there are cases in which a blur amount is detected due to fluctuations from the capability of the vibration detecting unit 11. For example, in a case such as that in which a gyro sensor is used as the vibration detecting unit 11, there will be cases in which the zero point (the voltage when still) of the gyro sensor fluctuates in accordance with the passage of time after being turned on, or changes in the environmental temperature. Therefore, if the output from the gyro sensor is detected as the blur signal as is, there will be changes in the output of the gyro sensor regardless of the camera 1 actually being still. Therefore, the camera 1 will detect that fluctuations are input. As a result of this, in a case such as when the photographer is actually holding the camera 1 in their hands and performing image capturing, there is a possibility that the input of a larger blur than the camera shake that is being input will be detected. In order to make up for the difference between the camera shake that is actually input and the output of the vibration detecting unit 11 as has been described above, the camera is placed on a tripod, the output of the vibration detecting unit from when the camera was still is detected to serve as the blur signal 22, and is recorded as a blur amount 24 from when the camera was still.

Note that the blur amount (blur amount 24 from when the camera was still) that is calculated based on the blur signal 22 is converted to a distance on the image capturing element 6. A pixel number that has further been converted to μm or the pixel pitch of the image capturing element 6, or the like is used as the unit for the distance that is calculated. For example, in the case in which a gyro sensor is used as the vibration detecting unit 11, the angular velocity ω is detected. The camera system control unit 5 integrates the angular velocity ω and converts it into a blur angle θ, and multiplies this by a focal point distance of the image capturing optical system 3, as is shown in the Formula 1 below, and thereby calculates the blur amount on the image capturing surface. θ is a sufficiently small value, and therefore it is possible to perform approximate calculation with tan θ≈θ.

$$\text{Blur amount} = f \times \tan \theta \approx f \times \theta [\mu m] \quad (1)$$

f: focal point distance

As is shown in FIG. 2D, due to the image capturing shown in FIG. 2C, a captured image 25 is acquired from the image capturing element 6, and a blur signal 26 is acquired from the vibration detecting unit 11. The camera system control unit 5 calculates a blur amount (IS-OFF image blur amount) 27 for the image based on the captured image 25. IS is an abbreviation of Image Stabilizer. In the example shown in FIG. 1A, in which the checkered evaluation chart 2 is made the subject, the camera system control unit 5 may also count the amount of borderlines between the white and black regions that are blurry and have become grey, and make this the IS-OFF image blur amount 27. It is also possible to calculate the IS-OFF image blur amount 27 based on a movement vector between a plurality of frames. In addition, the camera system control unit 5 also calculates a blur amount (IS-OFF image blur amount) based on the blur signal 26.

In the image capturing shown in FIG. C, the photographer holds the camera 1 in their hands and performs image capturing, and therefore, camera shake is input. In addition, image capturing is performed in a state in which the camera shake correction function is off, and therefore, image blur correction is not performed by the blur correcting unit 12. Therefore, the blur signal 26 is the blur signal for a case in which camera shake from the photographer was in effect. In addition, a blur amount corresponding to the blur signal 26 is calculated to serve as an IS-OFF blur amount 28. The calculated blur amount includes the camera shake that was in effect on the camera 1, and fluctuations due to the capabilities of the vibration detecting unit 11. In addition, the captured image 25 is a captured image from a case in which camera shake was in effect, and an image blur amount for the case in which camera shake was in effect is calculated to serve as an IS-OFF image blur amount 27.

As is shown in FIG. 2F, due to the image capturing shown in FIG. 2E, a captured image 29 is acquired from the image capturing element 6, and a blur signal 30 is acquired from the vibration detecting unit 11. The camera system control unit 5 calculates an image blur amount (IS-ON image blur amount) 31 based on the captured image 29. In addition, the camera control system 5 calculates a blur amount (IS-ON image blur amount) 32 based on the blur signal 30.

In the same manner as the image capturing shown in FIG. 2C, the photographer also performs image capturing by holding the camera 1 in their hands during the image capturing shown in FIG. 2E, and therefore, camera shake is input. In addition, image capturing is performed in a state in which the camera shake correction function is turned on, and therefore, image blur correction is performed by the blur correcting unit 12. Therefore, the blur signal 30 is a blur signal for a case in which camera shake from the photographer was in effect, and the captured image 29 is an image in which the camera shake has been corrected.

The IS-ON image blur amount 31 is a blur amount for an image from when blur correction was performed by the blur correcting unit in a case in which camera shake was in effect. The IS-ON blur amount is a blur amount corresponding to the blur signal 30. The IS-ON blur amount 32 includes camera shake that was in effect on the camera 1, as well as fluctuations due to the capability of the vibration detecting unit 11.

FIGS. 3A to 3E and FIGS. 4A to 4E are images explaining one example of an evaluation method for an image blur correction capability using a blur amount. FIG. 3A to FIG. 3E show a first method for evaluating image blur correction capability. FIG. 4A to 4E show a second method for evaluating image blur correction capability. In both the first method and the second method for evaluating image blur correction capability, the camera system control unit 5 evaluates the image blur correction capability based on a blur amount detected by the vibration detecting unit 11 and an image blur amount calculated from a captured image. Specifically, in the first method, the camera system control unit 5 evaluates (calculates) the image blur correction capability based on a ratio of the blur amount detected by the vibration detecting unit 11 in the state in which the camera shake correction function is turned on and the state in which the camera shake function is turned off, and the image blur amount calculated from the captured image. In addition, in the second method, the camera system control unit 5 corrects the IS-ON blur amount using the blur amount from when the camera 1 has been placed on a tripod, and calculates a corrected blur amount. In addition, the camera system control unit 5 corrects the IS-ON image blur amount using the image blur amount from when the camera 1 has been placed on a tripod, and calculates a corrected image blur amount. Then, the camera system control unit 5 calculates the image blur correction capability based on the calculated corrected blur amount and corrected image blur amount. Note that the order of each process in both the first method and the second method are not limited to the order of the processes that are explained below.

(Explanation of the First Method)

Figure 3A:
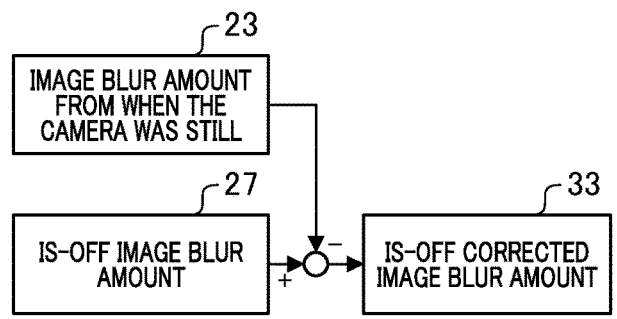

As is shown in FIG. 3A, the camera system control unit 5 corrects the IS-OFF image blur amount using the image blur amount 23 from when the camera was still, and calculates the IS-OFF corrected image blur amount 33. The IS-OFF corrected image blur amount 33 is an amount in which the image blur amount 23 from when the camera was still has been subtracted from the IS-OFF image blur amount 2', and represents the image blur amount purely due to camera shake, in which the out of focus offset has been removed from the IS-OFF image blur amount 7.

Figure 3B:
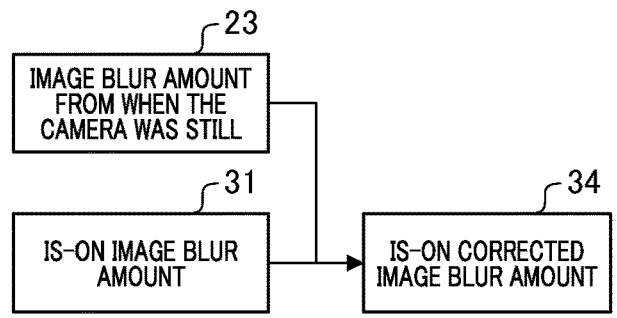

In addition, as is shown in FIG. 3B, the camera system control unit 5 corrects the IS-ON image blur amount using the image blur amount 23 from when the camera was still and calculates an IS-ON corrected image blur amount 34. The IS-ON corrected image blur amount 34 is an amount in which the image blur amount 23 from when the camera was still has been subtracted from the IS-ON image blur amount 31. The IS-ON image blur amount 31 is the blur amount that is calculated from an image that is the result of an image having been image blur corrected by the blur correcting unit 12. Therefore, the IS-ON corrected image blur amount 34 represents the remaining blur amount due to the image blur correction mechanism, in which the out of focus offset has been removed from the IS-ON image blur amount 31.

Figure 3C:
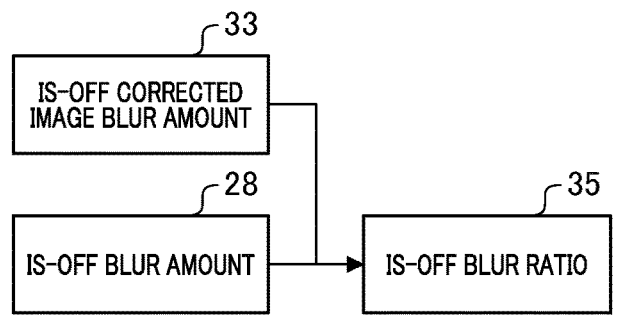
Figure 3D:
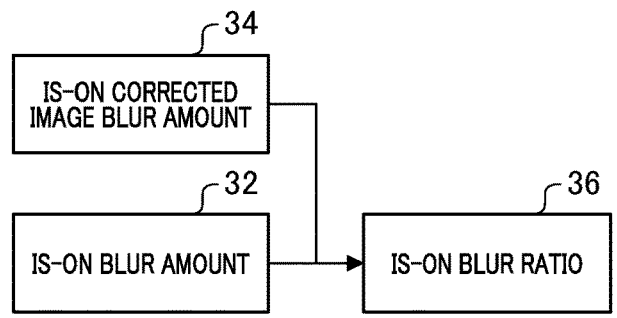

Next, as is shown in FIG. 3C, the camera system control unit 5 calculates an IS-OFF blur ratio 35, which is the ratio of the IS-OFF corrected image blur amount 33 and the IS-OFF blur amount 28. In addition, as is shown in FIG. 3D, the camera system control unit 5 calculates the IS-ON blur ratio 36, which is the ratio of the IS-ON corrected image blur amount 34 and the IS-ON blur amount 32. Note that the camera system control unit 5 may also calculate the ratio of the IS-OFF image blur amount 27 and the IS-OFF blur amount 28 to serve as the IS-OFF blur ratio 35. In addition, the camera system control unit 5 may also calculate the ratio of the IS-ON image blur amount 31, and the IS-ON blur amount to serve as the IS-ON blur ratio 36.

Figure 3E:
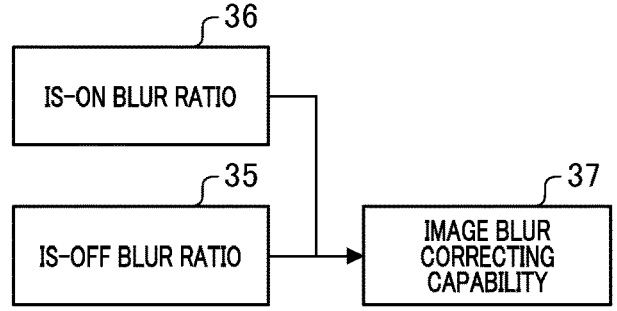

As is shown in FIG. 3E, the camera system control unit 5 calculates an image blur correction capability 37 based on the IS-ON blur ratio 36 and the IS-OFF blur ratio 35. Essentially, in a case in which the image blur correction capability is high, the IS-ON corrected image blur amount 34 will become small. Therefore, when the IS-ON blur ratio 36 is represented as (IS-ON corrected image blur amount 34)/(IS-ON blur amount 32), the value for the IS-ON blur ratio 36 will become smaller the higher the value for the image correction capability is.

In a case in which the capability of the vibration detecting unit 11 is good, and the fluctuations of the vibration detecting unit 11 from when the camera is still are small, the IS-OFF blur amount 28 becomes a size of the same extent as the IS-OFF corrected image blur amount 33. That is, the blur amount detected by the vibration detecting unit 11 and the image blur amount are approximately the same, and therefore, if the IS-OFF blur ratio 35 is represented as (IS-OFF corrected image blur amount 33)/(IS-OFF blur amount 28), this value becomes a value close to 1.

The camera system control unit 5 outputs a higher evaluation value to serve as the image blur correction capability the smaller the IS-ON blur ratio 36 is in relation to the IS-OFF blur ratio 35. The camera system control unit 5 may also determine the above-described evaluation value according to the ratio of the IS-ON blur ratio 36 with the IS-OFF blur ratio 35. In addition, the camera system control unit 5 may also determine the above-described evaluation value according to the size of the difference between the IS-ON blur ratio 36 and the IS-OFF blur ratio 35. The camera system control unit 5 performs the evaluation of the image blur correction capability by, for example, calculating an evaluation value for each shutter speed.

(Explanation of the Second Method)

Figure 4A:
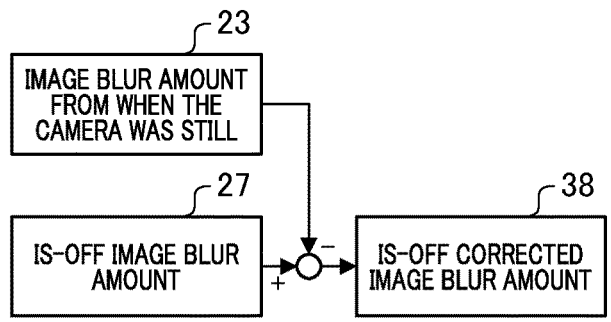

As is shown in FIG. 4A, the camera system control unit 5 corrects the IS-OFF image blur amount using the image blur amount 23 from when the camera was still and calculates an IS-OFF corrected image blur amount 38. The IS-OFF corrected image blur amount 38 is an amount in which the image blur amount 23 from when the camera was still has been subtracted from the IS-OFF image blur amount 2', and represents the image blur amount purely due to camera shake, in which the out of focus offset has been removed from the IS-OFF image blur amount 7.

Figure 4B:
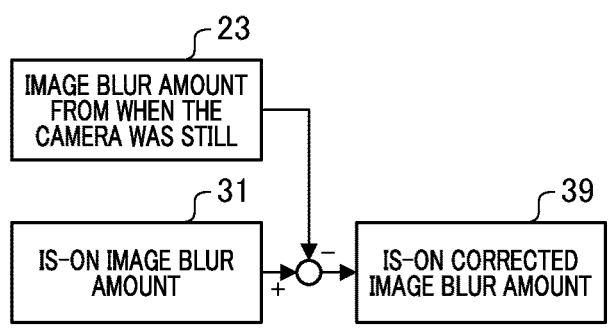

In addition, as is shown in FIG. 4B, the camera system control unit 5 corrects the IS-ON image blur amount using the image blur amount 23 from when the camera was still and calculates an IS-ON corrected image blur amount 39. The IS-ON corrected image blur amount is an amount in which the image blur amount 23 from when the camera was still has been subtracted from the IS-ON image blur amount 31, and therefore represents the remaining blur amount due to the image blur correction mechanism, in which the out of focus offset has been removed from the IS-ON image blur amount 31.

Figure 4C:
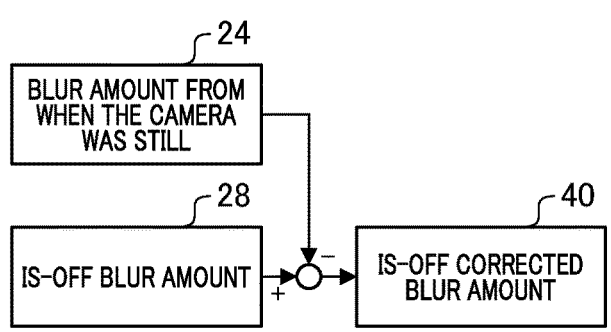

In addition, as is shown in FIG. 4C, the camera system control unit 5 corrects the IS-OFF blur amount 28 using the still blur amount 24, and calculates an IS-OFF corrected blur amount 40. The IS-OFF corrected blur amount 40 is an amount in which the blur amount 24 from when the camera was still has been subtracted from the IS-OFF blur amount 28, and represents the blur amount purely due to camera shake, in which the fluctuations due to the gyro capabilities from when the camera was still have been removed from the IS-OFF blur amount 28.

Figure 4D:
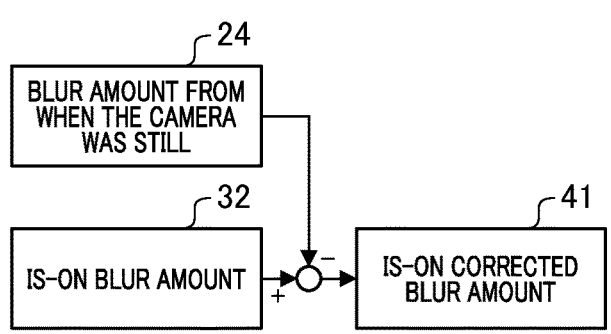

In addition, as is shown in FIG. 4D, the camera system control unit 5 corrects the IS-ON blur amount 32 using the blur amount 24 from when the camera was still, and calculates an IS-ON corrected blur amount 41. The IS-ON corrected blur amount 41 is an amount in which the blur amount 24 from when the camera was still has been subtracted from the IS-ON blur amount 32, and represents a blur amount purely due to camera shake, in which the fluctuations due to the gyro capabilities from when the camera was still have been removed from the IS-ON blur amount 32.

Note that although the calculation method for the IS-OFF corrected blur amount 40 is different from the calculation method for the IS-OFF corrected image blur amount 38, they are blur amounts from the same image capturing time, and the IS-OFF corrected blur amount 40 essentially becomes a blur amount of the same extent as the IS-OFF corrected image blur amount 38. Therefore, the camera system control unit 5 may also be made to determine whether or not the IS-OFF corrected image blur amount 38 and the IS-OFF corrected blur amount 40 are of the same extent, and to determine whether or not the measurements for the calculation of the image blur correction capability are being properly performed.

Figure 4E:
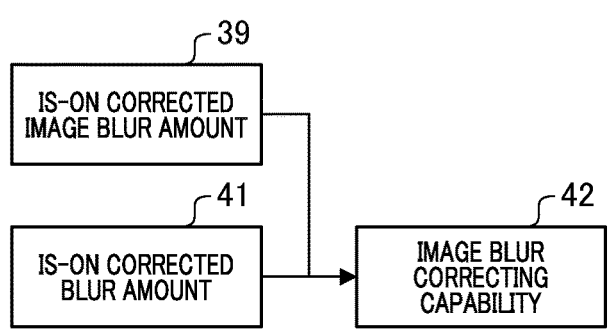

As is shown in FIG. 4E, the camera system control unit 5 evaluates the image blur correction capability 42 based on the IS-ON corrected image blur amount 39 and the IS-ON corrected blur amount 41. The IS-ON corrected blur amount 41 is the blur amount purely due to camera shake, which can be obtained by subtracting the blur amount originating from fluctuations due to the vibration detecting unit 11 when the camera was still. Therefore, the camera system control unit 5 outputs a higher evaluation value to serve as the image blur correction capability the smaller the IS-ON corrected image blur amount 39, which represents the remaining blur amount, is in comparison to the IS-ON corrected blur amount 41. The camera system control unit 5 may also calculate to what extent the IS-ON corrected blur amount 41 is corrected in the image, and calculate the evaluation value for the image blur correction capability 42 based on the calculated blur amount. That is, the camera system control unit 5 determines the above-described evaluation value according to the size of the blur amount corresponding to the difference between the IS-ON corrected image blur amount 39 and the IS-ON corrected blur amount 41. The camera system control unit 5 may also determine the above evaluation value according to a ratio of the IS-ON corrected image blur amount 39 to the IS-ON corrected blur amount 41. The camera system control unit 5 performs the evaluation of the image blur correction capability by, for example, calculating an evaluation value for each shutter speed.

The present invention is not limited to the two evaluation methods that were described above. Other methods may also be applied as long as it is possible to calculate the image blur correction capability based on the blur amount obtained from the vibration detecting unit 11 and the blur amount obtained from the captured image. In the case in which the camera shake correction function has been turned off, to what extent noise or drift are present in the vibration detecting unit 11 may be measured based on the image blur amount and a blur amount according to a blur signal output from the vibration detecting unit 11, and the measurement results may be used in the calculation of the image blur correction capability.

(Data Storage Method for When the Blur Correcting Capability is Evaluated)

Figure 5A:
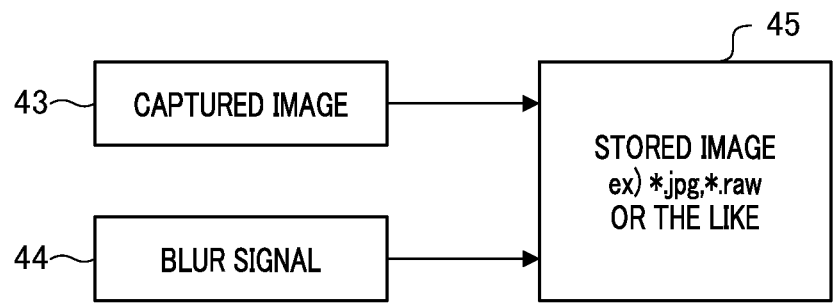
Figure 5B:
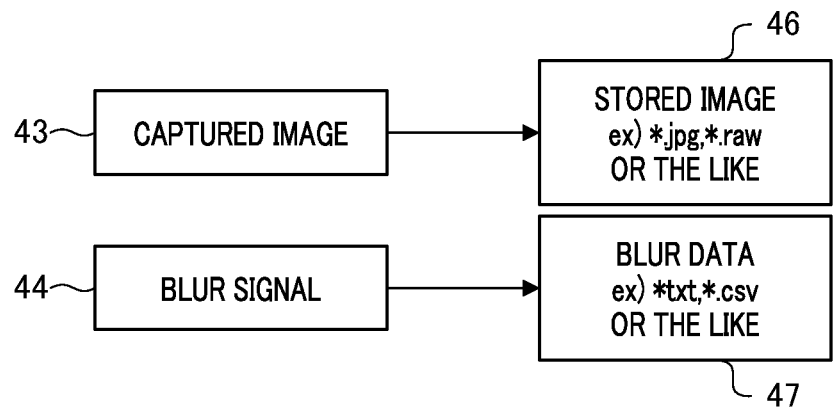

FIG. 5A and FIG. 5B are diagrams explaining the storage method for captured images and blur data from the time of the evaluation of the image blur correction capability. FIG. 5A shows one example of blur data being stored as a portion of image information. In the example that is shown in FIG. 5A, the camera control system 5 generates a image 45 based on the captured image 43 and the blur signal 44, and stores this on a storage unit such as the memory 8 or the like. The stored image 45 is a captured image that is stored in a state in which the blur data relating to the blur signal 44 has been written thereon. The blur data is data relating to the blur signal that is output by the vibration detecting unit 11, and is a sensor-output from a sensor such as, for example, a gyro sensor, an acceleration sensor, or the like. It is preferable that the sensor-output is synchronized with the timing according to the sampling rate for the blur data and stored. It does not matter if the sampling rate for the blur data that is acquired in the camera system control unit 5 and the sampling rate that is stored to serve as the blur data do not match. FIG. 5B shows one example of a image 46 based on the captured image and blur data based on a blur signal being saved as data that are different from each other.

As is shown in FIG. 5A, in as case in which the blur data is stored to serve as a portion of the stored image 45, for example, the blur data is written into a portion of the region for the image information. In the case in which the image is stored using a file format such as a JPEG image or the like, a method is assumed in which the blur data is written in the image to serve as a portion of the EXIF information, and stored together with the image. In the case of this storage method, even when the image blur correction capability is being evaluated, it is possible to read out the captured image and the blur data from a single file, therefore having the advantage of easy evaluation.

In addition, as is shown in FIG. 5B, a method in which the blur data 47 is stored as a separate file from the stored image 46 has the following advantage. For example, in contrast with changes in the file size for the image data being small even if the exposure time changes, blur data is chronological data, and therefore, the data amount will increase the longer the exposure time is. Therefore, by storing the image data and the blur data as files that are different from each other, it becomes possible to store the image data without increasing the data amount.

(Flowchart Relating to the Evaluation Method for the Image Blur Correction Capability)

Figure 6:
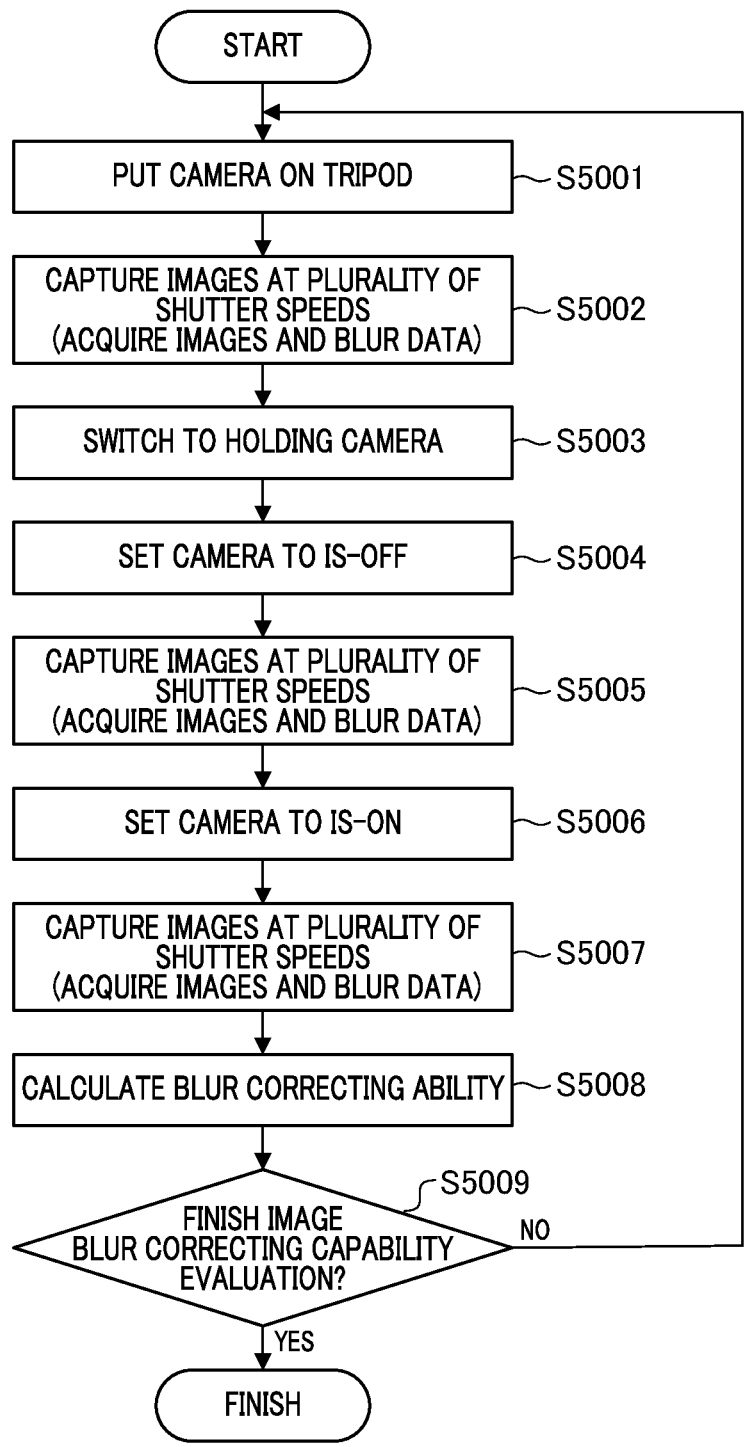

FIG. 6 is a flowchart explaining the evaluation method for the image blur correction capability. The present flowchart is primarily realized by the camera system control unit 5 reading and executing a control program from the memory 8. Note that in FIG. 6, "S" refers to the step number for each processing according to the present flowchart.

In S5001, the photographer places the camera 1 on a tripod. Next, during S5002, the camera system control unit 5 sets the camera 1 to a plurality of shutter speeds in accordance with an operation of the photographer, and captures images of the evaluation chart 2. When the images are being captured, it is preferable that a remote release cable is used, or that a timer function is used so that no camera shake is input to the camera 1. The camera system control unit 5 acquires the image data related to the captured image and the blur data related to the blur signal, and stores these on the memory 8.

Next, during S5003, the photographer removes the camera 1 from the tripod, and uses the camera in a hand-held state. During S5004, the camera system control unit 5 sets the camera shake correction function to off (IS-OFF) according to an operation by the photographer. Next, during S5005, the camera system control unit 5 sets the camera 1 to a plurality of shutter speeds according to an operation of the photographer, and captures images of the evaluation chart 2. The camera system control unit 5 acquires the image data related to the captured image and the blur data related to the blur signal, and stores these on the memory 8.

Next, during S5006, the camera system control unit 5 sets the camera shake correction function to ON (IS-ON) according to an operation of the photographer. Next, during S5007, the camera system control unit 5 sets the camera 1 to a plurality of shutter speeds according to an operation of the photographer, and captures images of the evaluation chart 2. The camera system control unit 5 acquires the image data related to the captured image and the blur data related to the blur signal and stores these on the memory 8.

During S5008, the camera system control unit 5 calculates the image blur correction capability using the above-described first method or second method based on the image data related to the captured image and the blur data related to the blur signal. Although an example has been explained in which the camera system control unit 5 of the camera 1 calculates the image blur correction capability, an external information processing apparatus may also acquire the stored image data and blur data, and calculate the image blur correction capability.

Next, during S5009, the camera system control unit 5 determines whether to complete the evaluation of the image blur correction capability according to an operation by the photographer. In the case in which the image blur correction capability evaluation is to be completed, the processing is completed. In the case in which the image blur correction capability evaluation is not to be completed, the processing returns to S5001.

The shutter speeds that are set during the image capturing in S5005 and S5007 preferably capture images using the same settings as the settings for the image capturing in S5002. This is because data that was image captured with the camera 1 placed on a tripod, and data that was image captured when the camera shake correction function was turned on/off are used in the calculation, and therefore, it is preferable to use blur data from the same exposure time. It becomes possible to also measure the fluctuations in the capability of the vibration detecting unit 11 to the same extent, and to correctly estimate the blur amount due purely to camera shake by using blur data from the same exposure time during the calculation of the image blur correction capability.

The image capturing apparatus in the present embodiment calculates the image blur correction capability from a blur amount corresponding to a blur signal output by the vibration detecting unit 11, and a blur amount obtained from the captured image. Therefore, it is possible to precisely evaluate the image blur correction capability regardless of the camera shake from the photographer, that is, regardless of individual differences in photographers, through the image capturing apparatus of the present embodiment.

Second Embodiment

Figure 1B:
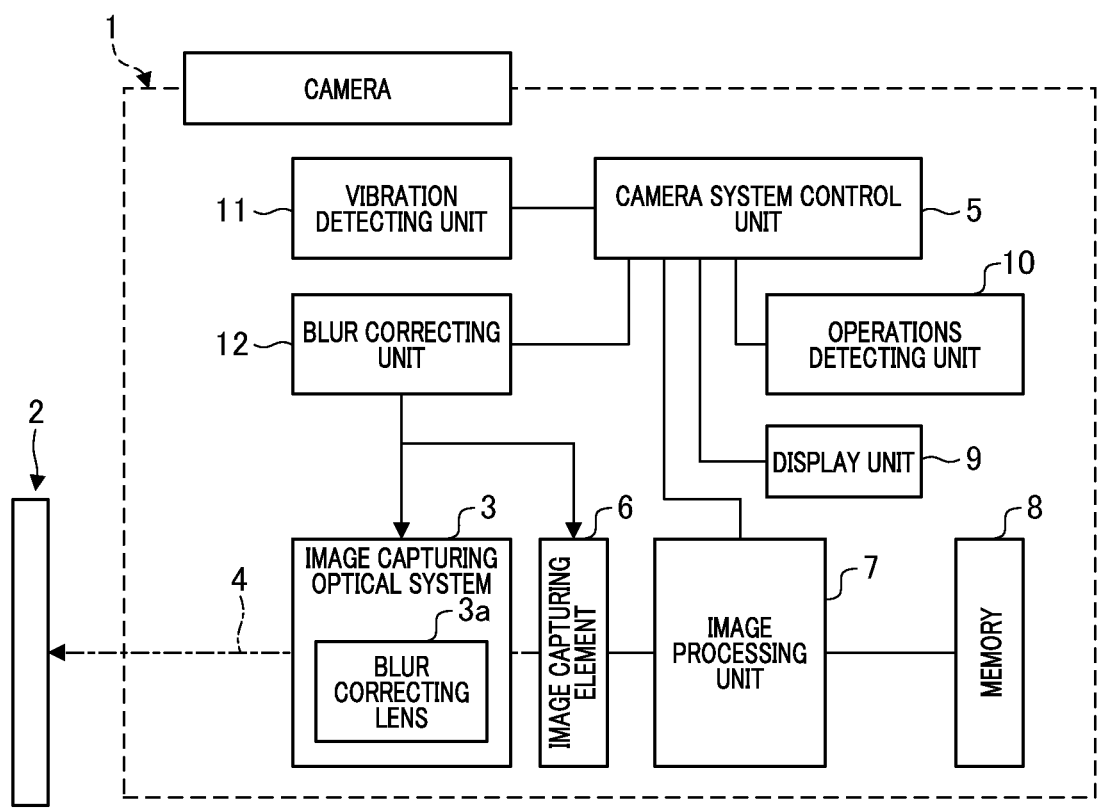
Figure 7A:
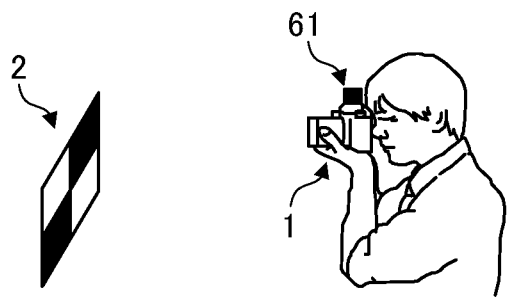
Figure 7B:
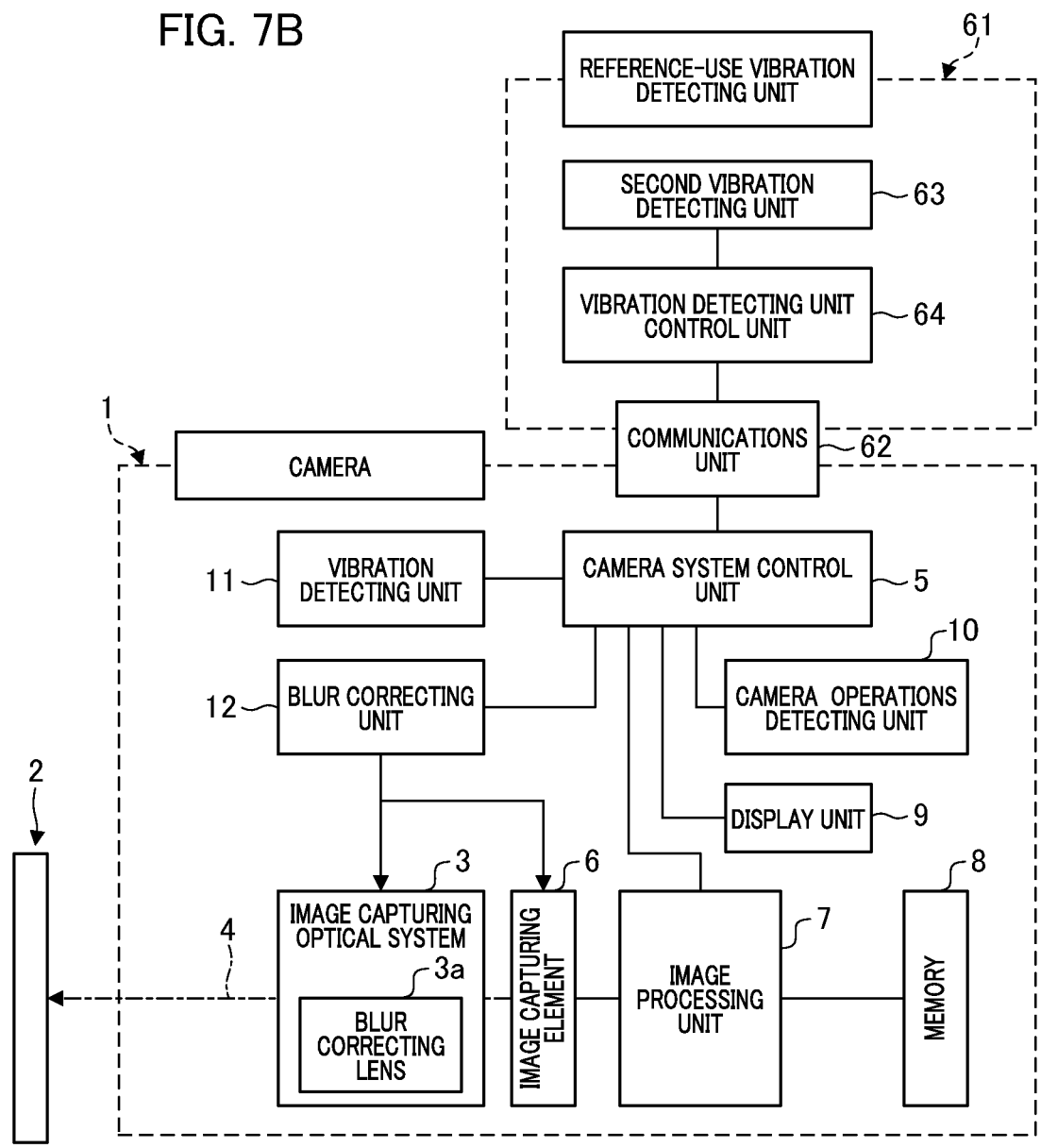

FIG. 7A and FIG. 7B are diagrams explaining an image capturing apparatus of the second embodiment. FIG. 2A shows a situation in which the photographer is capturing images of the evaluation chart 2 while holding the camera 1 in their hands. FIG. 2B shows a functional block diagram of the image capturing apparatus. From among the configurational elements that are shown in FIG. 7A and FIG. 7B, the elements that have the same reference number as the configurational elements of the image capturing apparatus of the first embodiment that are shown in FIGS. 1A and 1B are the same configurational elements as the configurational elements of the image capturing apparatus that is shown in FIG. 1A and FIG. 1B. The fundamental configuration of the image capturing apparatus of the second embodiment is the same as that of the image capturing apparatus of the first embodiment and therefore, the differences between the two will be primarily explained.

In FIGS. 7A, and 7B, a reference-use blur detecting unit 61 is placed on top of a body unit of the camera 1. In the present embodiment, the reference-use blur detecting unit 61 is placed on top of the body unit of the camera 1 to serve as an external apparatus. However, as long as the reference-use blur detecting unit 61 can be held by the photographer at the same time as the body unit of the camera 1, it may be placed in any position. The reference-use blur detecting unit 61 communicates with the camera system control unit 5 inside of the camera 1 via a communications unit 62.

The camera system control unit 5 acquires blur data based on the output of a second vibration detecting unit that has been provided in the reference-use blur detecting unit 61 instead of the output from the vibration detecting unit 11 that has been proved in the camera 1, and uses this in the calculation of the image blur correction capability. The reference-use blur detecting unit 61 has a second vibration detecting unit 63, a vibration detecting unit control unit 64, and the communications unit 62. The vibration detecting unit control unit 64 controls the entirety of the reference-use blur detecting unit 61. The second vibration detecting unit 63 detects vibrations applied to the camera 1, and outputs a vibration detection signal. The communications unit 62 mediates communication between the reference-use vibration detecting unit 61 and the camera 1. The camera system control unit 5 is able to evaluate the image blur correction capability regardless of individual differences in the capability of the vibration detecting unit 11 due to the model of the camera 1 and the like, by calculating the image blur correction capability using blur data based on the output of the second vibration detecting unit 63.

In the present embodiment, the camera system control unit 5 acquires the image data related to the captured image and the blur data at the same time via the communications unit 62. However, the present invention is not limited thereto. For example, it may also be made such that the camera 1 and the reference-use vibration detecting unit 61 are put in a state in which only the image capturing timing is able to be synchronized, and the captured image is stored in the camera 1, while the blur data is stored in the reference-use blur detecting unit 61. As another method, the blur data relating to the second vibration detecting unit 63 may also be transmitted to the camera 1 via the communications unit 62, and recorded in the memory 8 inside the camera 1 at the same time as the captured image. In addition, the image data that has been acquired by the camera 1 may also be transmitted to the reference-use blur detecting unit 61 via the communications unit 62 and recorded on a memory that is provided in the reference-use blur detecting unit 61 at the same time as the blur data.

Figure 8A:
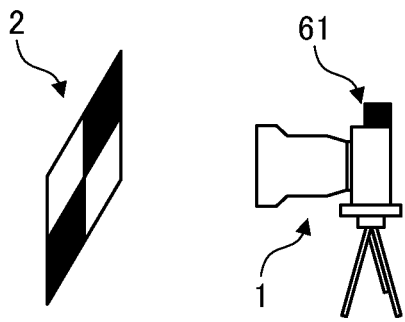
Figure 8B:
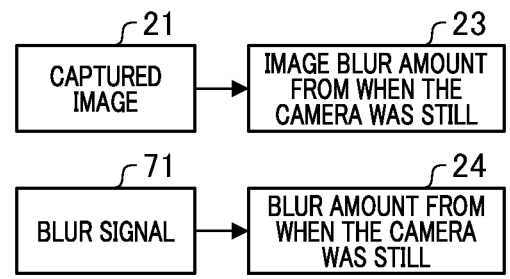
Figure 8C:
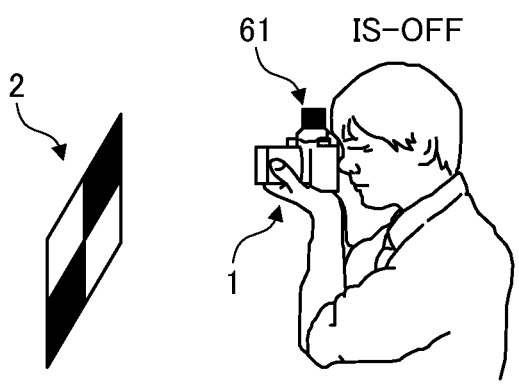
Figure 8D:
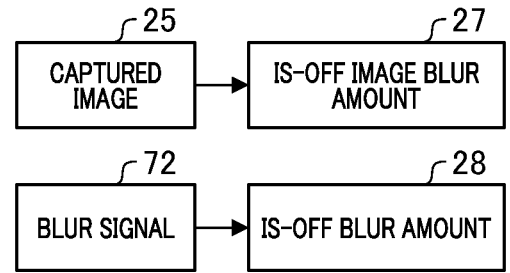
Figure 8E:
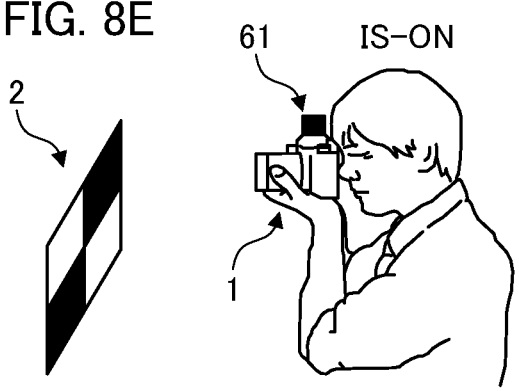
Figure 8F:
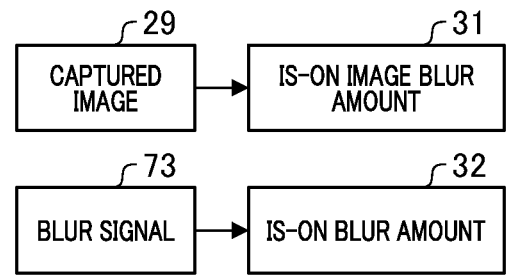

FIG. 8A to 8F are diagrams explaining the evaluation method for the image blur correction capability in the second embodiment. FIG. 8A shows a state in which the camera 1 has been placed on a tripod, which is a support member, and images have been captured of the evaluation chart 2 in a state in which camera shake does not enter the camera 1 or the reference-use blur detecting unit 61. FIG. 8B shows one example of information acquired by the image capturing shown in FIG. 8A. FIG. 8C shows a situation in which the photographer holds the camera 1 and the reference-use blur detecting unit 61 and is capturing images of the evaluation chart 2 in a state in which the blur correcting unit 12 is not being operated (a state in which the camera shake correcting function is off). FIG. 8D shows one example of information acquired during the image capturing shown in FIG. 8C. FIG. 8E shows a situation in which the photographer holds the camera 1 and the reference-use blur detecting unit 61, and is capturing images of the evaluation chart 2 in a state in which the blur correcting unit 12 has been made to function (a state in which the camera shake correcting function is on). FIG. 8F is shows one example of information that is acquired during the image capturing shown in FIG. 8E.

From among the information that is shown in FIGS. 8B, 8D, and 8F, the information that has been given the same references numerals as the information shown in FIGS. 2B, 2D, and 2F is the same information as the information that is shown in FIGS. 2B, 2D, and 2F. In the second embodiment, the blur amount 24 from when the camera was still that is shown in FIG. 8B is calculated based on a blur signal 71 that is obtained from the second vibration detecting unit 63. In addition, an IS-OFF blur amount 28 that is shown in FIG. 8D is calculated based on a blur signal 72 that is obtained from the second vibration detecting unit 63. In addition, an IS-ON blur amount 32 that is shown in FIG. 8F is calculated based on a blur signal 73 that is obtained from the second vibration detecting unit 63. The calculation/evaluation methods for the image blur correction capability using the blur amounts obtained from each image capturing that are shown in FIGS. 8B, 8D, and 8F are the same as the methods that have been explained in reference to FIG. 3A to FIG. 6.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-111602, filed Jul. 12, 2022, which is hereby incorporated by reference herein in its entirety.

What is claimed is:

1. An evaluation method for an image blur correction capability of an image capturing apparatus, the method comprising:
   acquiring a captured image of a subject;
   acquiring a detection signal relating to vibrations applied to the image capturing apparatus; and
   evaluating the image blur correction capability based on a first blur amount calculated based on the acquired captured image, and a second blur amount calculated based on the acquired detection signal relating to the vibrations,
   wherein the image blur correction capability is evaluated based on a first ratio, which is a ratio of the first blur amount and the second blur amount that are calculated in a case in which a blur correcting unit of the image capturing apparatus has not been made to operate, and a second ratio, which is a ratio of the first blur amount and the second blur amount that are calculated in a case in which the blur correcting unit has been made to operate, and
   wherein in the evaluating, the smaller the second ratio is in relation to the first ratio, the higher of an evaluation value is output to serve as the image blur correction capability.

2. The evaluation method according to claim 1, wherein the blur correction capability is evaluated based on the first blur amount and the second blur amount that are calculated in a case in which a blur correcting unit of the image capturing apparatus has not been made to operate and the first blur amount and the second blur amount that are calculated in a case in which the blur correcting unit has been made to operate.

3. The evaluation method according to claim 1, wherein a ratio of a blur amount that is obtained by correcting the first blur amount calculated in a case in which the image blur correcting unit of the image capturing apparatus has not been made to operate using the first blur amount that is calculated in a case in which image capturing is performed by placing the image capturing apparatus on a support member, and the second blur amount that is calculated in a case in which the image blur correcting unit has not been made to operate is made a first ratio,
   a ratio of a blur amount that is obtained by correcting the first blur amount calculated in a case in which the image blur correcting unit has not been made to function using the first blur amount that is calculated in a case in which image capturing is performed by placing the image capturing apparatus on a support member, and the second blur amount that is calculated in a case in which the image blur correcting unit has been made to operate is made a second ratio, and
   the image blur correction capability is evaluated based on the first ratio and the second ratio.

4. The evaluation method according to claim 1, wherein the image blur correction capability is evaluated based on a first corrected blur amount that is a blur amount obtained by correcting the first blur amount calculated in a case in which the image blur correcting unit of the image capturing apparatus has been made to operate using the first blur amount that is calculated in a case in which image capturing is performed by placing the image capturing apparatus on a support member, and a second corrected blur amount that is a blur amount obtained by correcting the second blur amount that is calculated in a case in which the image blur correcting unit has been made to operate using the second blur amount calculated in a case in which image capturing is performed by placing the image capturing apparatus on a support member.

5. The evaluation method according to claim 1, wherein the second blur amount that is calculated based on the detection signal relating to the vibration is stored on the storage unit to serve as a portion of the captured image.

6. The evaluation method according to claim 1, wherein a detection signal relating to the vibration, which is detected by the vibration detector of a body unit of the image capturing apparatus, is acquired to serve as the detection signal relating to the vibration applied to the image capturing apparatus.

7. The evaluation method according to claim 1, wherein a detection signal relating to a vibration, which is detected by a vibration detector of an external device that is different from a body of the image capturing apparatus, is acquired to serve as the detection signal relating to the vibration applied to the image capturing apparatus.

8. The evaluation method according to claim 4, wherein in the evaluating, the smaller the first corrected blur amount is in relation to the second corrected blur amount, the higher of an evaluation value is output to serve as the image blur correction capability.

9. An image capturing apparatus comprising:
at least one processor and computer memory storing computer instructions which, when executed by the processor, operate to make the processor function as:
a first acquisition unit configured to acquire a captured an image of a subject;
a second acquisition unit configured to acquire a detection signal relating to a vibration applied to the image capturing apparatus; and
a control unit configured to evaluate an image blur correction capability of the image capturing apparatus based on a first blur amount calculated based on the captured image of the subject acquired by the first acquisition unit, and a second blur amount calculated based on the detection signal relating to the vibration acquired by the second acquisition unit,
wherein the processor evaluates the image blur correction capability based on a first ratio, which is a ratio of the first blur amount and the second blur amount that are calculated in a case in which a blur correcting unit of the image capturing apparatus has not been made to operate, and a second ratio, which is a ratio of the first blur amount and the second blur amount that are calculated in a case in which the blur correcting unit has been made to operate, and
wherein the processor outputs a higher evaluation value to serve as the image blur correction capability the smaller the second ratio is in relation to the first ratio.

10. The image capturing apparatus according to claim 9, wherein
the processor evaluates the image blur correction capability based on the first blur amount and the second blur amount that are calculated in a case in which a blur correcting unit of the image capturing apparatus has not been made to operate, and the first blur amount and the second blur amount that are calculated in a case in which the blur correcting unit has been made to operate.

11. The image capturing apparatus according to claim 9, wherein
the processor:
makes a ratio of a blur amount that is obtained by correcting the first blur amount calculated in a case in which the image blur correcting unit of the image capturing apparatus has not been made to operate using the first blur amount that is calculated in a case in which image capturing is performed by placing the image capturing apparatus on a support member, and the second blur amount that is calculated in a case in which the image blur correcting unit has not been made to operate a first ratio;
makes a ratio of a blur amount that is obtained by correcting the first blur amount calculated in a case in which the image blur correcting unit has been made to operate using the first blur amount that is calculated in a case in which image capturing is performed by placing the image capturing apparatus on a support member, and the second blur amount that is calculated in a case in which the image blur correcting unit has been made to operate a second ratio; and
evaluates the image blur correction capability based on the first ratio and the second ratio.

12. The image capturing apparatus according to claim 9, wherein
the processor evaluates the image blur correction capability based on a first corrected blur amount that is a blur amount obtained by correcting the first blur amount calculated in a case in which the image blur correcting unit of the image capturing apparatus has been made to operate using the first blur amount that is calculated in a case in which image capturing is performed by placing the image capturing apparatus on a support member, and a second corrected blur amount that is a blur amount obtained by correcting the second blur amount that is calculated in a case in which the image blur correcting unit has been made to operate using the second blur amount calculated in a case in which image capturing is performed by placing the image capturing apparatus on a support member.

13. The image capturing apparatus according to claim 9, wherein
the second blur amount that is calculated based on the detection signal related to the vibration is stored on the storage unit to serve as a portion of the captured image.

14. The image capturing apparatus according to claim 9, wherein
the processor acquires a detection signal relating to a vibration, which is detected by the vibration detector of the body unit of the image capturing apparatus, to serve as the detection signal relating to the vibration applied to the image capturing apparatus.

15. The image capturing apparatus according to claim 9, wherein
the processor acquires a detection signal relating to a vibration, which is detected by a vibration detector of an external device that is different from the body of the image capturing apparatus, to serve as the detection signal relating to the vibration applied to the image capturing apparatus.

16. The image capturing apparatus according to claim 12, wherein
the processor outputs a higher evaluation value to serve as the image blur correction capability the smaller the first corrected blur amount is in relation to the second corrected blur amount.

17. A non-transitory storage medium storing a control program of an image capturing apparatus, causing a computer to perform each step of a control method for the image capturing apparatus, the method comprising:

acquiring a captured an image of a subject;

acquiring a detection signal relating to a vibration applied to the image capturing apparatus; and evaluating the image blur correction capability of the image capturing apparatus based on a first blur amount calculated based on the acquired captured image, and a second blur amount calculated based on the acquired detection signal relating to the vibration, wherein the evaluating is based on a first ratio, which is a ratio of the first blur amount and the second blur amount that are calculated in a case in which a blur correcting unit of the image capturing apparatus has not been made to operate, and a second ratio, which is a ratio of the first blur amount and the second blur amount that are calculated in a case in which the blur correcting unit has been made to operate, and wherein in the evaluating, the smaller the second ratio is in relation to the first ratio, the higher of an evaluation value is output to serve as the image blur correction capability.

* * * * *